(12) United States Patent
Bhatnagar

(10) Patent No.: US 8,364,616 B2
(45) Date of Patent: Jan. 29, 2013

(54) APPROACH FOR SOLVING A CONSTRAINED OPTIMIZATION PROBLEM

(75) Inventor: Shalabh Bhatnagar, Bangalore (IN)

(73) Assignee: Indian Institute of Science, Bangalore, Karnataka (IN)

( * ) Notice: Subject to any disclaimer, the term of this patent is extended or adjusted under 35 U.S.C. 154(b) by 806 days.

(21) Appl. No.: 12/533,084

(22) Filed: Jul. 31, 2009

(65) Prior Publication Data

US 2010/0268677 A1    Oct. 21, 2010

(30) Foreign Application Priority Data

Apr. 21, 2009    (IN) .............................. 916/CHE/2009

(51) Int. Cl.
*G06F 15/18* (2006.01)
(52) U.S. Cl. ........................................................ 706/19
(58) Field of Classification Search .................... 706/46, 706/19, 16
See application file for complete search history.

(56) References Cited

U.S. PATENT DOCUMENTS 7,184,992 B1 *    2/2007    Polyak et al. .................. 706/46

OTHER PUBLICATIONS

Bhatnagar Shalabh, Hemachandra N. and Mishra Vivek Kumar, "Stochastic Approximation Algorithms for Constrained Optimization via Simulation", Accepted in ACM Transactions on Modeling and Computer Simulation, 2010, pp. 1-25.

* cited by examiner

*Primary Examiner* — Alan Chen
*Assistant Examiner* — Ola Olude-Afolabi
(74) *Attorney, Agent, or Firm* — Ren-Sheng International

(57) ABSTRACT

Approaches for performing simulation optimization for solving a constrained optimization problem are generally disclosed. One embodiment according to the present disclosure is to formulate a Lagrange equation having incorporated a Lagrange parameter, a first long run average function for an objective associated with the constrained optimization problem, and a second long run average function for a constraint associated with the constrained optimization problem. Then, to identify a parameter value that may lead to an extreme value for the Lagrange equation, in an iterative manner, averages of the first long run average function and the second long run average function are calculated, a gradient of the Lagrange equation is estimated, and the Lagrange parameter is updated.

20 Claims, 8 Drawing Sheets

600

600 A computer program product

604 A signal bearing medium 602 at least one of one or more instructions for formulating a Lagrange equation having incorporated a Lagrange parameter, a first long run average function for an objective associated with the constrained optimization problem, and a second long run average function for a constraint associated with the constrained optimization problem; or one or more instructions for iteratively calculating averages of the first long run average function and the second long run average function, estimating a gradient of the Lagrange equation, and updating the Lagrange parameter, so that a parameter value that may lead to an extreme value for the Lagrange equation is identified.

| 606 a computer readable medium | 608 a recordable medium | 612 a communications medium |

Fig. 6

APPROACH FOR SOLVING A CONSTRAINED OPTIMIZATION PROBLEM

CROSS-REFERENCE TO RELATED APPLICATIONS

This application claims priority to Indian Patent Application 916/CHE/2009, filed on Apr. 21, 2009.

BACKGROUND

Optimization problems associated with constraints are referred to as constrained optimization problems. Some examples include power flow problems, image reconstruction problems, pattern recognition problems, data processing problems, network flow problems, and optimal control problems. A constrained optimization problem generally includes an objective and at least one constraint. Conventionally, to solve a constrained optimization problem, the problem is first represented in a mathematical formulation, which is generally in a form of an analytical function of at least one parameter. A solution to the mathematical formulation is to find the parameter value that minimizes or maximizes the mathematical formulation while satisfying the constraint associated with the optimization problem. For example, the mathematical formulation of a constrained optimization problem could be $f(x)=ax^2+bx+c$. One solution is to find the parameter x of a certain value bound by the constraint associated with the problem that results in an extreme value of f(x). However, on many occasions, a constrained optimization problem cannot be simply characterized by an analytical function in terms of the parameters of interest. Moreover, since both objective and constraint from a real or simulated system are often corrupted by random noises, deriving an efficient and convergent computational procedure to perform simulation optimization for solving a constrained optimization problem is generally challenging.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 is a block diagram illustrating a computer program product for performing simulation optimization to solve a constrained optimization problem, all arranged in accordance with at least some embodiments of present disclosure.

DETAILED DESCRIPTION

Figure 1:
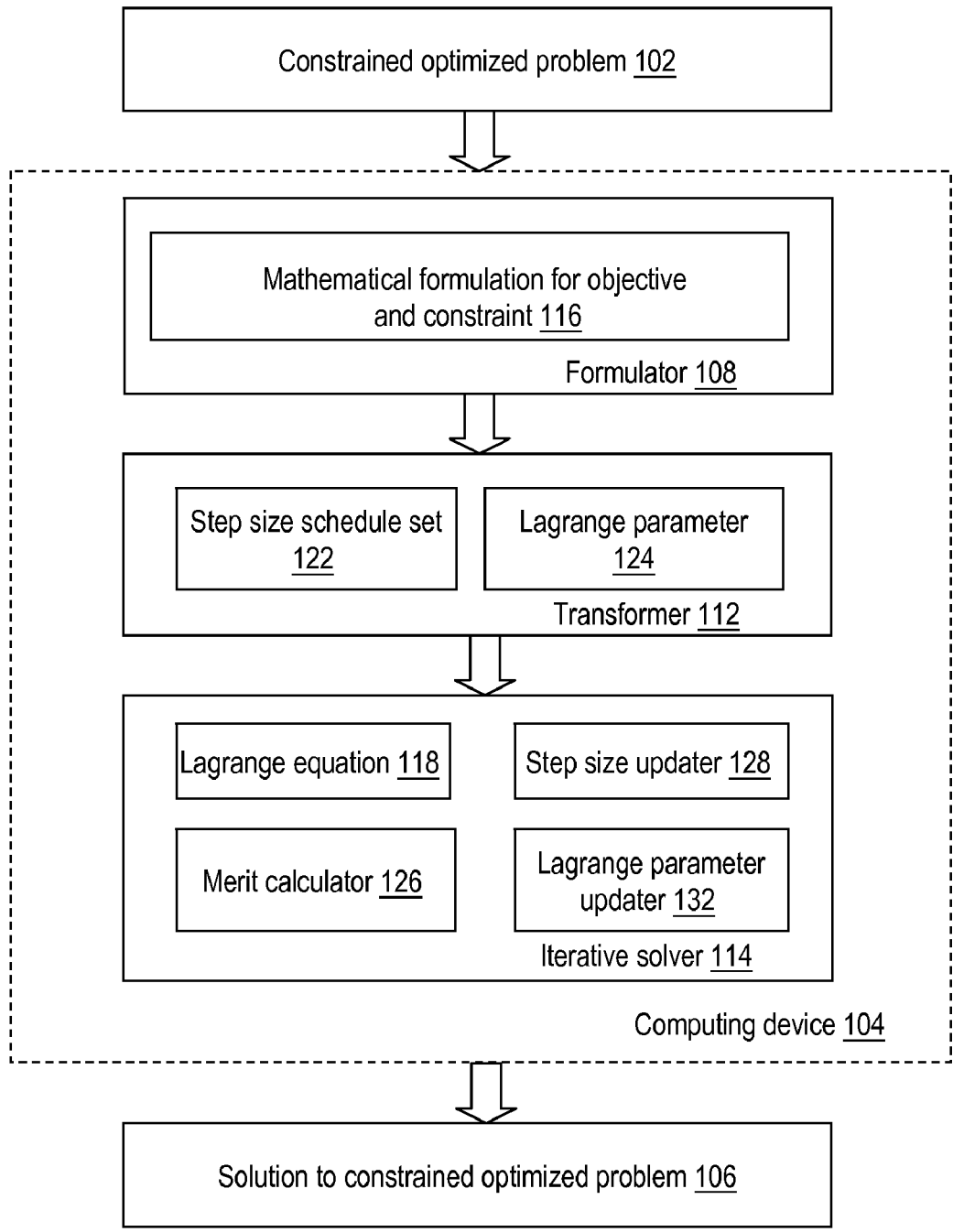
FIG. 1 is a schematic diagram illustrating an example computing device configured to perform simulation optimization for solving a constrained optimization problem.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs and systems related to solving a constrained optimization problem.

FIG. 1 is a schematic diagram illustrating an example computing device 104 configured to perform simulation optimization for solving a constrained optimization problem, arranged in accordance with at least some embodiments of the present disclosure. Here, the term "simulation optimization" generally refers to an approach for identifying points of minimum (e.g., solution candidates) using simulated outcomes. In some implementations, the constraints associated with the constrained optimization problem 102 are inequality constraints. The computing device 104 could be any device with processing capabilities. The computing device 104 comprises a formulator 108, a transformer 112, and an iterative solver 114. After the transformer 112 receives a mathematical formulation 116 of the constrained optimization problem 102 from the formulator 108, the transformer 112 prepares an initial step size schedule set 122 and a Lagrange parameter 124. Here, the mathematical formulation 116 is expressed in terms of long run average (over stochastic) functions, because the constrained optimization problem 102 cannot be appropriately represented by an analytical expression in terms of the parameters of interest. In some implementations, the parameters of interest generally refer to the parameters-to-be-optimized.

Using the Lagrange parameter 124, the transformer 112 could generate a Lagrange equation 118, though not in terms of the parameters-to-be-optimized. The Lagrange equation 118 is a non-constrained form of the constrained optimization problem 102 after having absorbed the constraints into the objective. Thereafter, the Lagrange equation 118, along with the step size schedule set 122, is transferred to the iterative solver 114. It is worth noting that the Lagrange parameter 124 could be a multi-dimensional set of parameters corresponding to their respective constraints.

In some implementations, the iterative solver 114 comprises a merit calculator 126, a step size updater 128, and a Lagrange parameter updater 132. The merit calculator 126 is configured to iteratively compute values for the parameters-to-be-optimized, so that such values would lead to identifying the extreme value of the Lagrange equation 118. Each iteration is associated with a set of step size schedules 122. The set of step size schedules 122 may be updated by the step size updater 128 after the completion of an iteration, and the updated step size schedules are used in the next iteration. Similarly, every iteration is also associated with its respective Lagrange parameter 124, and the Lagrange parameter 124 may be updated by the Lagrange parameter updater 132 after the completion of an iteration.

When the merit calculator 126 concludes its estimation iterations (for example, the merit calculator performs the estimation iterations for a predetermined amount of times), the values of the parameters-to-be-optimized obtained in the final iteration may be used to obtain the extreme value of the Lagrange equation 118. Alternatively, the values of the parameters-to-be-optimized obtained by the merit calculator 126 may be applied to an actual system, which could be correspond to the computing device 104 itself or another physically distinct device, to determine whether the performance of the system is indeed affected in an expected manner.

Figure 2:
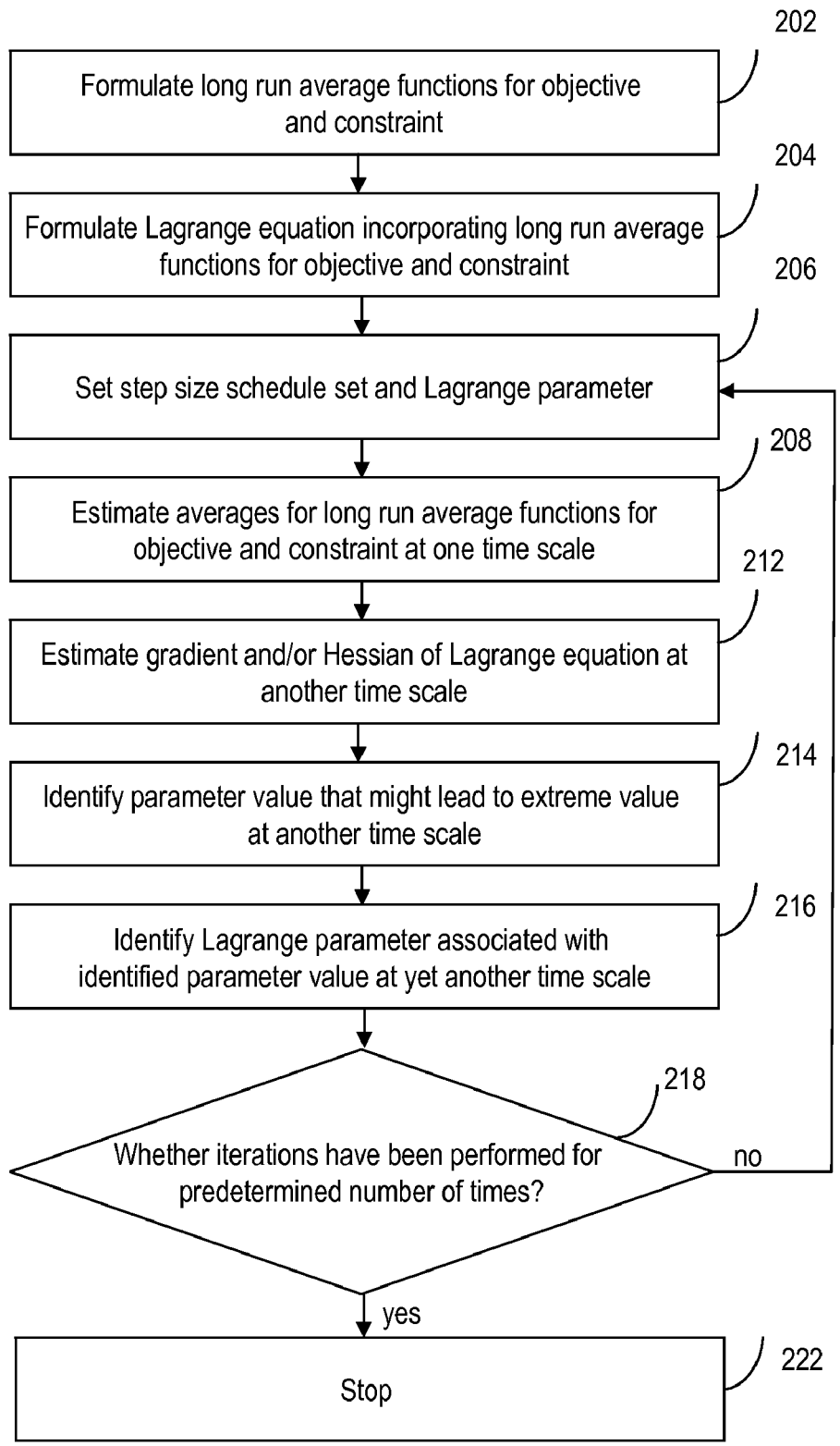
FIG. 2 is a flowchart illustrating example operations for estimating the value of the parameter-to-be-optimized.

In conjunction with FIG. 1, FIG. 2 is a flowchart illustrating example operations for estimating values of the parameter-to-be-optimized, arranged in accordance with at least some embodiments of the present disclosure. In an example operation 202, the formulator 108 formulates long run average functions for the objective and the constraint of the constrained optimization problem 102. In operation 204, the transformer 112 formulates a corresponding Lagrange equation 118 on the basis of the long run average functions for the objective and the constraint. In operation 206, the transformer 112 sets and incorporates the step size schedule set 122 and Lagrange parameter 124 into the formulated Lagrange equation 118 before transferring the Lagrange equation 118 to the iterative solver 114. In operation 208, the merit calculator 126 estimates averages of the long run average functions of the objective and constraint at one time scale. The time scale, which corresponds to a step size schedule, refers to a multiplying factor that is applied to a stochastic update of the operation associated therewith. A faster time scale corresponds to a larger step size schedule. Therefore, an operation associated with a faster time scale is supposed to converge faster than an operation associated with a slower time scale. In operation 212, the merit calculator 126 estimates a gradient and/or a Hessian of the Lagrange equation 118 at another time scale. To solve the Lagrange equation 118, the estimated gradient and/or Hessian of the Lagrange equation 118 are utilized. Taking quasi-Newton estimation method for example, any given function (Lagrange equation 118 included) could be written as follows:

$$f(x + \Delta x) \cong f(x) + \nabla f(x)^T \Delta x + \frac{1}{2} \Delta x^T B \Delta x$$

wherein $\nabla f(x)$ is the gradient while B stands for the approximation to a Hessian matrix.

With the gradient and Hessian, the merit calculator 126 identifies the value of the parameter-to-be-optimized that may lead to the estimated extreme value in the present iteration at yet another time scale in operation 214. In operation 216, the merit calculator 126 identifies the Lagrange parameter associated with that particular identified parameter value. In some implementations, the merit calculator 126 further determines whether the iterations have been performed for a predetermined number of times. If so, the iterations stop in operation 222, and the best value of the parameter-to-be-optimized that could potentially lead to the extreme value of the Lagrange equation 118 is selected among the values obtained during the iterations. Otherwise, another iteration, which might be associated with the updated Lagrange parameter 124 and step size schedule set 122, is performed. To set or update the Lagrange parameter 124 in each iteration is one approach for the operations shown in FIG. 2 to converge to a desired point that lies within the region defined by the constraint.

Figure 3A:
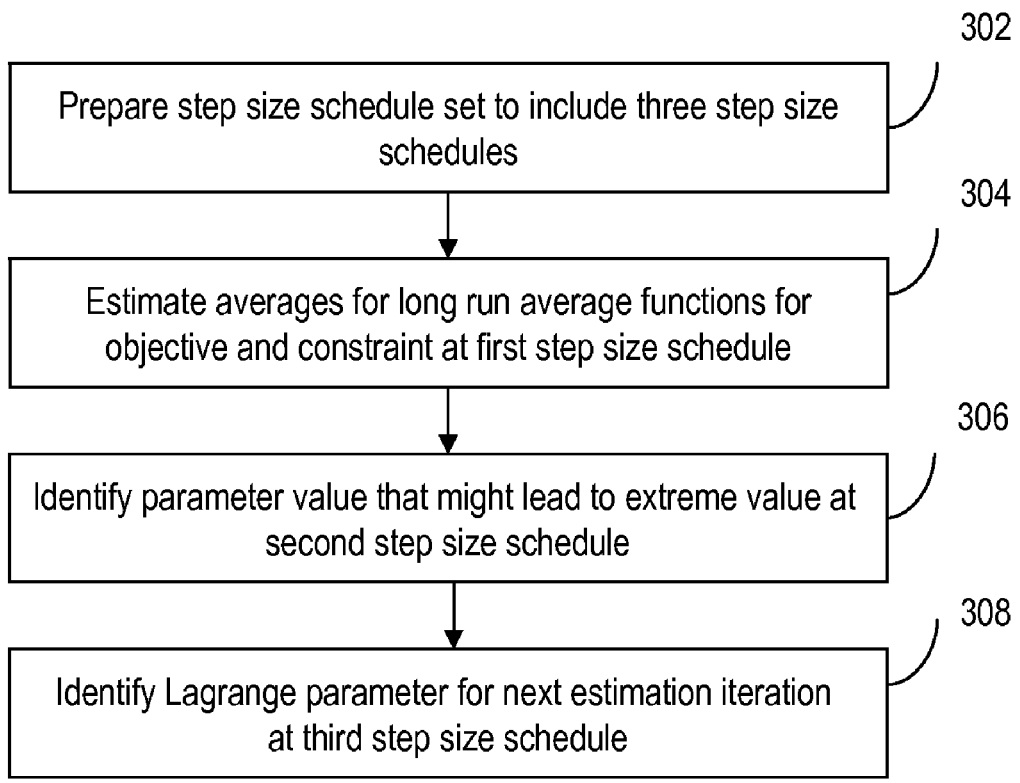
FIG. 3A is an example flow chart further illustrating certain operations of FIG. 2 that utilize estimated gradient for estimating the value of the parameter-to-be-optimized.

In conjunction with FIGS. 1 and 2, FIG. 3A is an example flow chart further illustrating certain operations of FIG. 2 that utilize estimated gradient for estimating the value of the parameter-to-be-optimized, arranged in accordance with at least some embodiments of the present disclosure. Some examples of such operations include the constrained gradient-smoothed functional (CG-SF) approach and the constrained gradient-simultaneous perturbation stochastic approximation (CG-SPSA). In an example operation 302, the transformer 112 prepares the step size schedule set to include three different step size schedules, a first step size schedule, a second step size schedule, and a third step size schedule. Here, the first step size schedule is larger than the second step size schedule, and the second step size schedule is larger than a third step size schedule. The merit calculator 126 calculates the averages of the long run average functions for the objective and the constraint at the first step size schedule in operation 304 by averaging data over a predetermined period of time. In one implementation, the data might be actual data that the computing device 104 receives and operates on. In another implementation, the data might be simulated data supplied by a data simulation apparatus (not shown in the drawings).

The merit calculator 126 identifies the value for the parameter-to-be-optimized that might lead to the extreme value of the Lagrange equation 118 at the second step size schedule in operation 306. Over the course of identifying such a value in operation 306, the estimation of the gradient of the Lagrange equation 118 may be utilized. In some implementations, the merit calculator 126 employs two parallel simulations to estimate the gradient. One simulation is a nominal simulation, and the other is a perturbed simulation. The nominal simulation may be based on one parameter-to-be-optimized, and the perturbed simulation may be based on the sum of the same parameter-to-be-optimized and a vector of Gaussian distributed random variables multiplies by a positive constant. In alternative implementations, the nominal simulation may be based on the parameter-to-be-optimized, and the perturbed simulation may be based on the sum of the same parameter-to-be-optimized plus independent vectors of independent symmetric Bernoulli distributed random variables multiplied by respective positive constants.

In operation 308, the merit calculator 126 identifies the Lagrange parameter associated with the identified value for the parameter-to-be-optimized at the third step size schedule. After the identification of the Lagrange parameter in one iteration, the Lagrange parameter is updated before the next iteration begins.

Figure 3B:
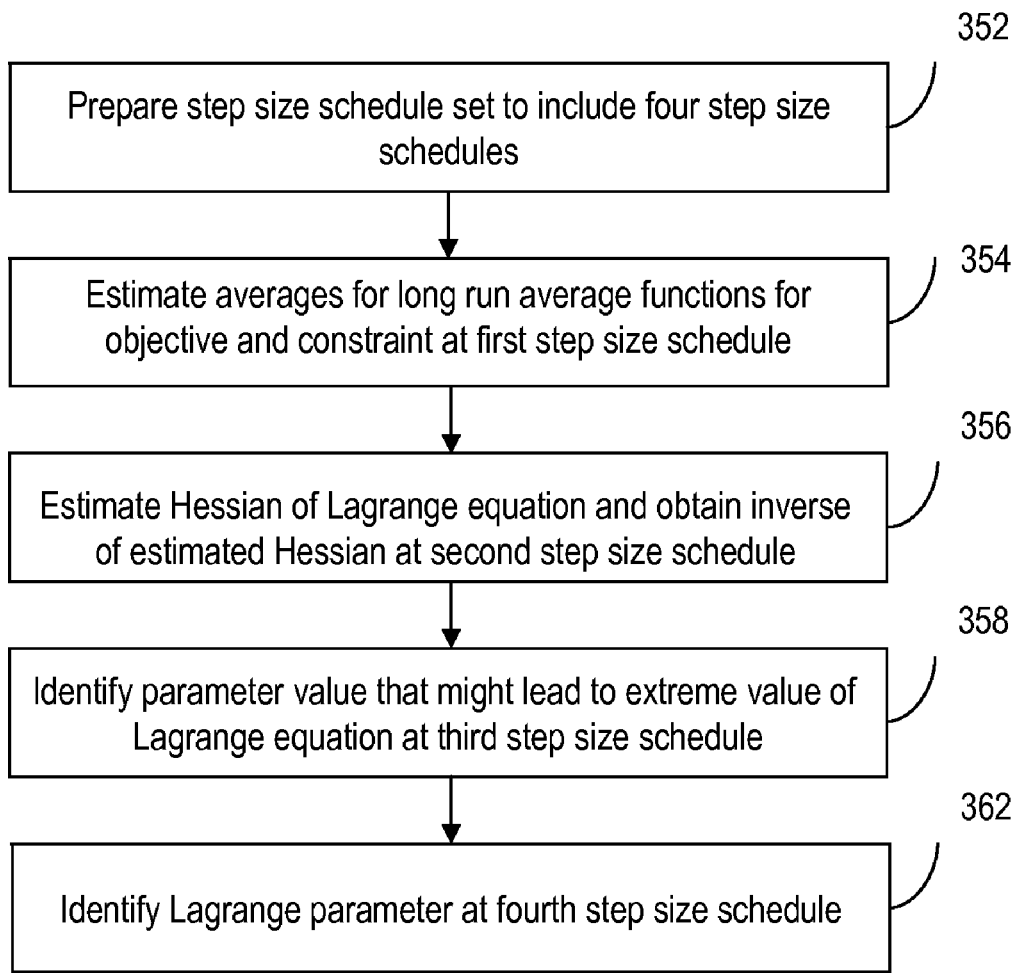
FIG. 3B is an example flow chart further explaining several operations of FIG. 2 that utilize one Newton-based approach for estimating the value of the parameter-to-be-optimized.

In conjunction with FIGS. 1 and 2, FIG. 3B is an example flow chart further explaining several operations of FIG. 2 that utilize one Newton-based approach for estimating the value of the parameter-to-be-optimized, arranged in accordance with at least some embodiments of the present disclosure. An example of such an approach includes the constrained Newton-smoothed functional (CN-SF) approach. In operation 352, the transformer 112 prepares the initial step size schedule set to have four distinct step size schedules, a first step size schedule, a second step size schedule, a third step size schedule, and a fourth step size schedule. Here, the estimation of Hessian is generated first. If the Hessian could be estimated at a fastest pace (i.e., a largest step size schedule), then the inverse Hessian could be also estimated efficiently. Thus, the second step size schedule is the largest in the step size schedule set prepared in operation 352. Also, the second step size schedule is larger than the first step size schedule, which is larger than the third step size schedule. In accordance with this configuration, the third step size schedule is larger than the fourth step size schedule.

In operation 354, the merit calculator 126 calculates the averages of long run average functions for objective and constraint by averaging actual or simulated data over a predetermined period of time at the first step size schedule. In operation 356, the merit calculator 126 estimates the Hessian of the Lagrange equation at the second step size schedule. With the estimated Hessian, the merit calculator 126 could obtain an inverse Hessian and use it to identify the value of the parameter-to-be-optimized in an example equation as follows: $x_{n+1} = x_n - (HL(x_n))^{-1} \nabla L(x_n)$, where $HL(x_n)$ denotes Hessian of the Lagrange equation 118 at the $n^{th}$ iteration, and x refers to the parameter-to-be-optimized. In some implementations, the merit calculator 126 employs two parallel simulations to estimate the Hessian. One simulation may be a nominal simulation based on parameter-to-be-optimized, and the other simulation may be a perturbed simulation based on the parameter-to-be-optimized in the nominal simulation plus a vector of Gaussian distributed random variables multiplied by a positive constant.

In operation 358, the merit calculator 126 identifies the value of the parameter-to-be-optimized at the third step size schedule. Compared to the gradient-based method shown in FIG. 3A and discussed above, the Newton-based estimation method uses both the gradient and the Hessian of the Lagrange equation 118. In operation 362, the merit calculator 126 identifies the Lagrange parameter associated with the value of the identified parameter-to-be-optimized at the fourth step size schedule.

Figure 3C:
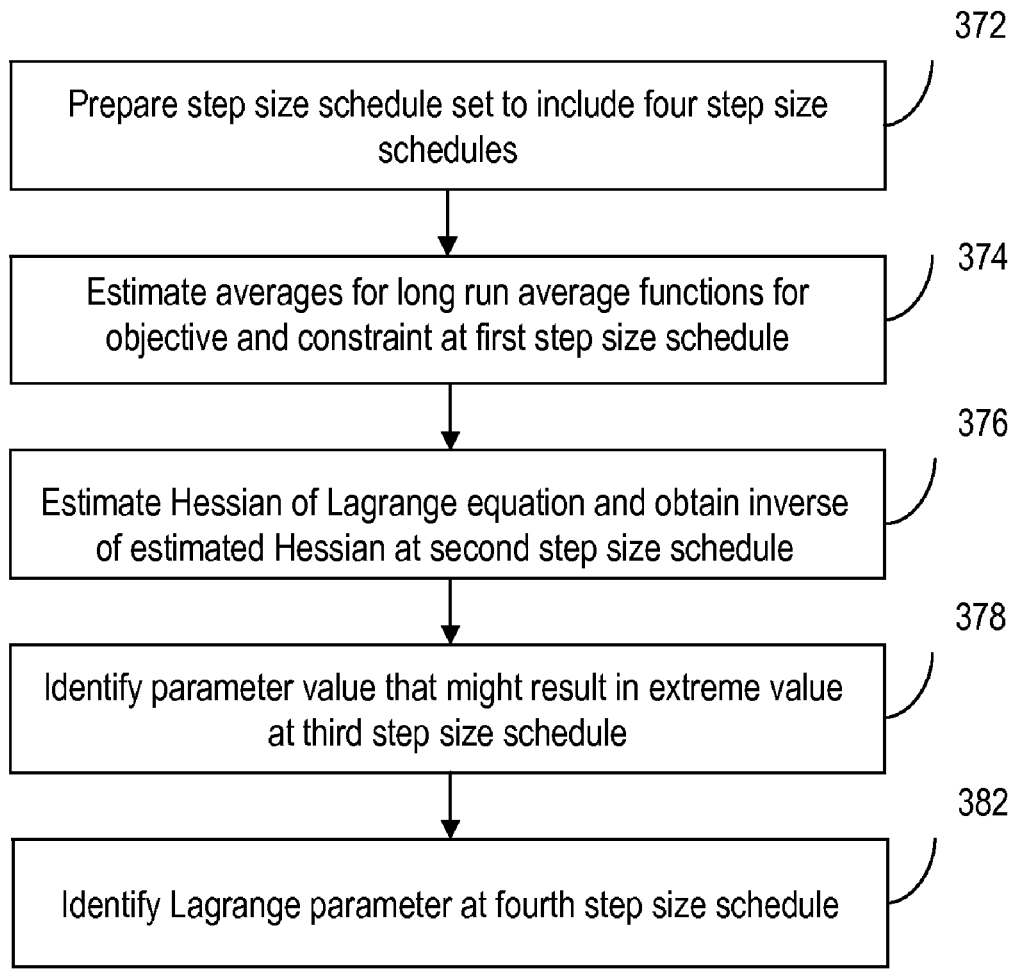
FIG. 3C is an example flow chart further explaining several operations of FIG. 2 that utilize another Newton-based approach for estimating the value of the parameter-to-be-optimized.

In conjunction with FIGS. 1 and 2, FIG. 3C is an example flow chart further explaining several operations of FIG. 2 that utilize another Newton-based approach for estimating the value of the parameter-to-be-optimized, arranged in accordance with at least some embodiments of the present disclosure. An example of such an approach includes the constrained Newton-simultaneous perturbation stochastic approximation (CN-SPSA) approach. In operation 372, the transformer 112 prepares the initial step size schedule set to include four distinct step size schedules, a first step size schedule, a second step size schedule, a third step size schedule, and a fourth step size schedule. Here, the first step size schedule is larger than the second step size schedule. The second step size schedule is larger than the third step size schedule. The third step size schedule is larger than the fourth step size schedule. In operation 374, the merit calculator 126 calculates the averages of long run average functions for objective and constraint, by averaging actual or simulated data over a predetermined period of time at the first step size schedule. In operation 376, the merit calculator 126 estimates the Hessian of the Lagrange equation 118 at the second step size schedule. Two parallel simulations are utilized to estimate the Hessian. In some implementations, one simulation is a nominal simulation based on the parameter-to-be-optimized. Another simulation is a perturbed simulation based on (1) the parameter-to-be-optimized used in the nominal simulation, and (2) independent vectors of Bernoulli distributed random variables multiplied by respective positive constants.

In operation 378, the merit calculator 126 identifies the value of the parameter-to-be-optimized that might result in the extreme value of the Lagrange equation 118 at the first step size schedule. In operation 382, the merit calculator 126 identifies the Lagrange parameter associated with the identified value of the parameter-to-be-optimized at the second step size schedule.

Figure 4:
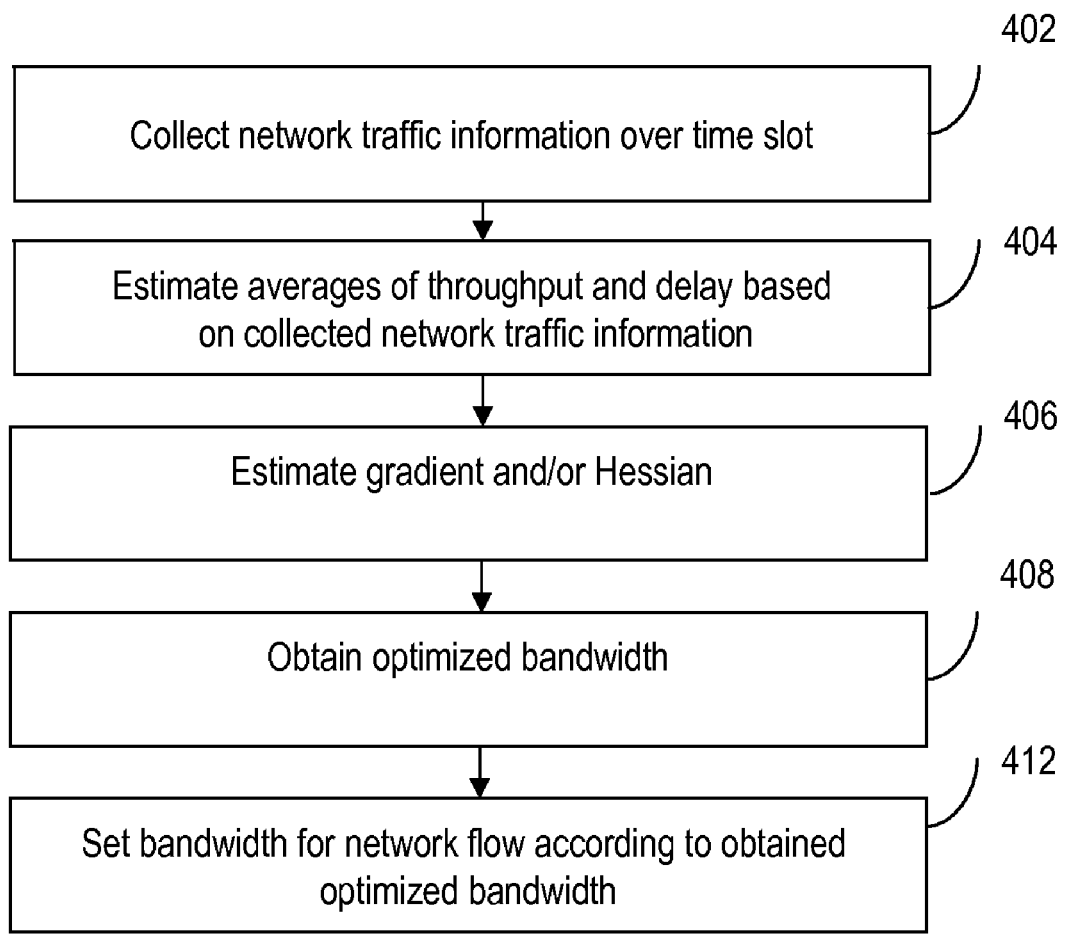
FIG. 4 is a flow chart illustrating an example process of maximizing the throughput of a network router while staying within a certain delay.

FIG. 4 is a flow chart illustrating an example process of maximizing the throughput of a network router while staying within a certain delay, arranged in accordance with at least some embodiments of the present disclosure. In this example embodiment, the objective for the network router is to maximize its throughput, and the constraint is for the network router to experience delay of less than a predetermined period of time. In some implementations, the throughput could be referred to as an expected rate at which network packets leave the network router. The delay could be measured based on the time span for the packets to leave the network router. The parameter-to-be-optimized could be a bandwidth associated with a network flow. In other words, an optimal bandwidth value generally refers to the bandwidth value that leads to the maximized throughput of the network router while satisfying the delay constraint.

One example long run average function for the throughput is as follows:

$$T(b) = \lim_{n \to \infty} \frac{\sum_{i=1}^{n} T_i}{n},$$

where $T_i$ is instantaneous throughput measured in the $i^{th}$ time interval.

One example long run average function for the delay is $$D(b) = \lim_{n \to \infty} \frac{\sum_{i=1}^{n} D_i}{n},$$

where $D_i$ is instantaneous delay occurred in $i^{th}$ time interval. After having collected network traffic in operation 402, the averages of the objective and constraint according to the long run average functions are calculated in operation 404. In order to take into account the delay constraint, an objective function could be shown in terms of the Lagrange equation, $L(b,\lambda) = T(b) + \lambda(D(b))$ with $\lambda$ being the Lagrange parameter (multiplier) and b being the bandwidth. To find the optimized bandwidth that could result in the extreme value of the Lagrange equation, estimations are performed in an iterative manner according to the stochastic gradient approaches or Newton estimation approaches discussed above. If a stochastic gradient approach is utilized, then the bandwidth at iteration (n+1) could be computed by an equation such as $b_{n+1} = b_n + \gamma_n \times \nabla L(b,\lambda)^T$, where $b_n$ refers to a row vector of bandwidths allocated to various flows at the $n^{th}$ iteration while $\gamma_n$ is the step size schedule used in the $n^{th}$ iteration. If a Newton estimation approach is used, then the bandwidth at iteration (n+1) could be computed by $b_{n+1} = b_n + \gamma_n \times \nabla L(b,\lambda)^T \times H(L(b,\lambda))^{-1}$ where $b_n$ means the bandwidth at the $n^{th}$ iteration while $\gamma_n$ is the step size schedule used in the $n^{th}$ iteration. For any identification of the bandwidth value, the gradient and/or Hessian of the Lagrange equation is obtained in operation 406. As such, the bandwidth value that might lead to the maximized throughput could be identified in operation 408. In some implementations, the optimized bandwidth value is applied to the network flow in operation 412 to check whether the anticipated maximized throughput is obtained.

It should be noted that some or all of the operations shown in FIG. 4 may be performed by the network router itself or by another device external to the network router. For example, the network traffic collection operation may be performed by the network router as it receives packets. Alternatively, the network traffic may also be collected in a device external to the network router. Moreover, the iterations of estimations may be performed by the network router as it receives packets or performed by the device external to the network router.

Figure 5:
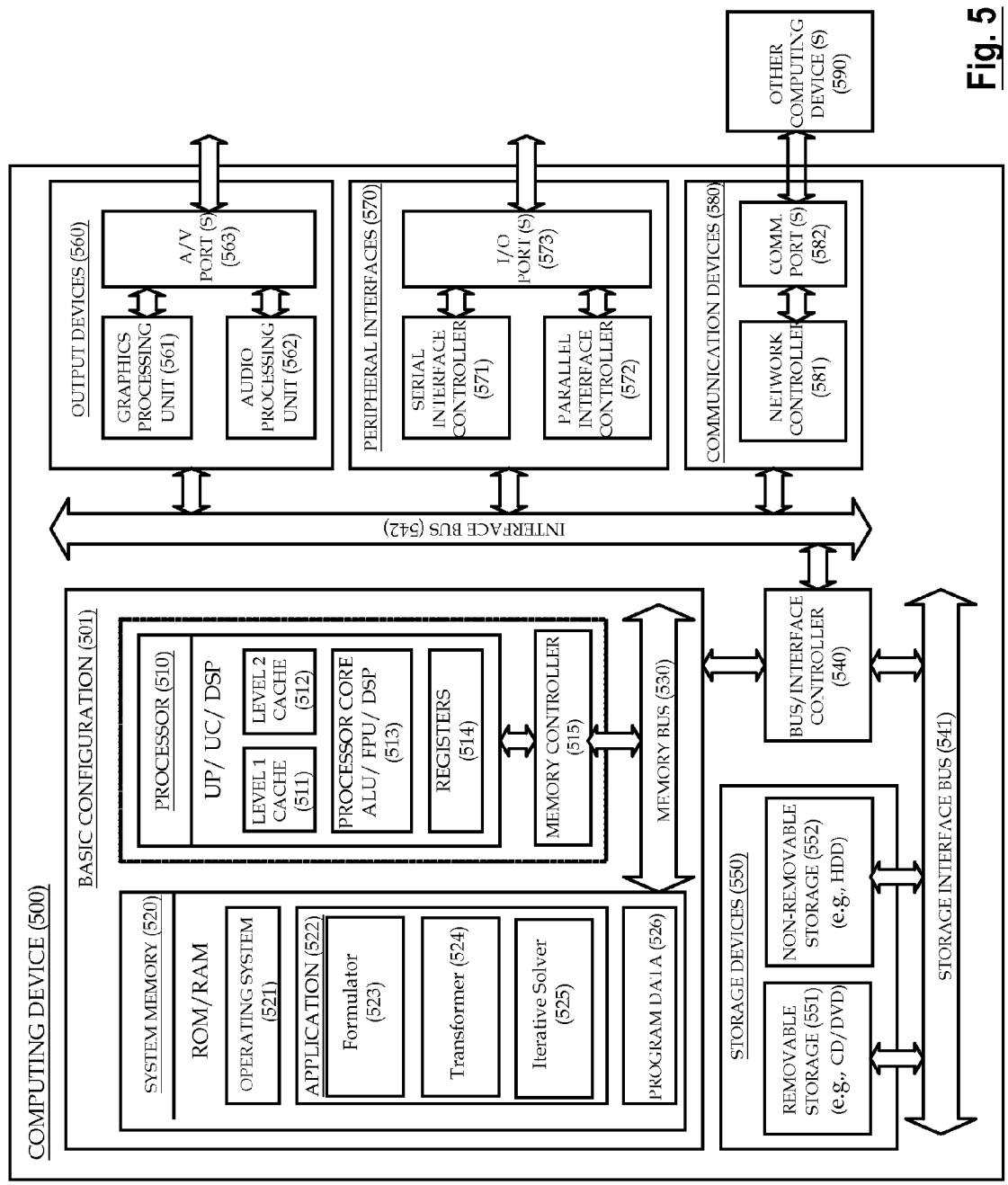
FIG. 5 is an example computing device configured to identify values for the parameter-to-be-optimized, such as the bandwidth.

FIG. 5 is a block diagram illustrating an example computing device 500 that is arranged for identifying values for the parameter-to-be-optimized, such as the bandwidth, by performing the operations illustrated in any of FIG. 2, FIG. 3A, FIG. 3B, FIG. 3C, and FIG. 4, in accordance with at least some embodiments the present disclosure. In a very basic configuration 501, computing device 500 includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include a formulator 523, a transformer 524, and an iterative solver 525. In some implementations, they may correspond to the formulator 108, the transformer 112, and the iterative solver 114, respectively, shown in FIG. 1. Program data 526 may include step size schedule set, Lagrange parameter, parameter associated with an objective (e.g., throughput), constraint (e.g., delay), parameter-to-be-optimized (e.g., bandwidth), and other data that the application 522 may be arranged to operate with. In some embodiments, application 522 may be arranged to operate with program data 526 on an operating system 521 such that values for the parameter-to-be-optimized may be identified.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a network router. It may also be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may yet also be implemented as a personal computer including both laptop computer and non-laptop computer configurations.

FIG. 6 is a block diagram illustrating a computer program product 600 for performing simulation optimization for solving a constrained optimization problem, arranged in accordance with at least some embodiments of the present disclosure. Computer program product 600 includes instructions 602 for carrying out any of the approaches discussed above. Computer program product 600 may be recorded in a signal bearing medium 604, a computer readable medium 606, a recordable medium 608, or any other communications medium 612.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. An apparatus for solving a constrained optimization problem, comprising:
   a processor; and
   a memory containing instructions that, when executed by the processor, cause the processor to
   formulate a Lagrange equation having incorporated a Lagrange parameter, a first long run average function for an objective associated with the constrained optimization problem, and a second long run average function for a constraint associated with the constrained optimization problem, wherein the constrained optimization problem cannot be appropriately represented by an analytical expression in terms of a parameter of interest, the first long run average function is not represented in terms of the parameter of interest, and the second long run average function is not represented in terms of the parameter of interest, and
   iteratively estimate averages of the first long run average function and the second long run average function, estimate a gradient of the Lagrange equation, and update the Lagrange parameter, so that a parameter value for the parameter of interest that may lead to an extreme value for the Lagrange equation is identified.

2. The apparatus of claim 1, wherein the memory contains instructions that, when executed by the processor, cause the processor to prepare a step size schedule set having at least a first step size schedule, a second step size schedule, and a third step size schedule.

3. The apparatus of claim 2, wherein the memory contains instructions that, when executed by the processor, cause the processor to update the Lagrange parameter at a smallest step size schedule in the step size schedule set.

4. The apparatus of claim 2, wherein the memory contains instructions that, when executed by the processor, cause the processor to identify the parameter value at a second smallest step size schedule in the step size schedule set.

5. The apparatus of claim 1, wherein the constraint is an inequality constraint.

6. The apparatus of claim 1, wherein the memory contains instructions that, when executed by the processor, cause the processor to estimate a Hessian of the Lagrange equation.

7. The apparatus of claim 6, wherein the memory contains instructions that, when executed by the processor, cause the processor to include a fourth step size schedule in the step size schedule set.

8. The apparatus of claim 7, wherein the memory contains instructions that, when executed by the processor, cause the processor to estimate the Hessian of the Lagrange equation at a largest step size schedule in the step size schedule set.

9. The apparatus of claim 6, wherein the memory contains instructions that, when executed by the processor, cause the processor to estimate the Hessian of the Lagrange equation using two parallel simulations with one being a perturbed simulation.

10. A non-transitory computer readable medium containing a sequence of instructions for performing simulation optimization for solving a constrained optimization problem, which when executed by a computing device, causes the computing device to:
    formulate a Lagrange equation having incorporated a Lagrange parameter, a first long run average function for an objective associated with the constrained optimization problem, and a second long run average function for a constraint associated with the constrained optimization problem, wherein the constrained optimization problem cannot be appropriately represented by an analytical expression in terms of a parameter of interest, the first long run average function is not represented in terms of the Parameter of interest, and the second long run average function is not represented in terms of the parameter of interest; and
    iteratively estimate averages of the first long run average function and the second long run average function based on data that the computing device receives, estimate a gradient of the Lagrange equation, and update the Lagrange parameter, so that a parameter value for the parameter of interest that may lead to an extreme value for the Lagrange equation is identified.

11. The non-transitory computer readable medium of claim 10, further containing a sequence of instructions, which when executed by the computing device, causes the computing device to prepare a step size schedule set having at least a first step size schedule, a second step size schedule, and a third step size schedule.

12. The non-transitory computer readable medium of claim 11, further containing a sequence of instructions, which when executed by the computing device, causes the computing device to update the Lagrange parameter at a smallest step size schedule in the step size schedule set.

13. The non-transitory computer readable medium of claim 11, further containing a sequence of instructions, which when executed by the computing device, causes the computing device to identify the parameter value at a second smallest step size schedule in the step size schedule set.

14. The non-transitory computer readable medium of claim 10, wherein the constraint is an inequality constraint.

15. The non-transitory computer readable medium of claim 10, further containing a sequence of instructions, which when executed by the computing device, causes the computing device to estimate a Hessian of the Lagrange equation.

16. The non-transitory computer readable medium of claim 15, further containing a sequence of instructions, which when executed by the computing device, causes the computing device to include a fourth step size schedule in the step size schedule set.

17. The non-transitory computer readable medium of claim 16, further containing a sequence of instructions, which when executed by the computing device, causes the computing device to estimate the Hessian of the Lagrange equation at a largest step size schedule in the step size schedule set.

18. The non-transitory computer readable medium of claim 15, further containing a sequence of instructions, which when executed by the computing device, causes the computing device to estimate the Hessian of the Lagrange equation using two parallel simulations with one being a perturbed simulation.

19. A network router configured to maximize throughput while satisfying an inequality constraint in terms of delay, comprising:
   a processing unit configured to
      formulate a Lagrange equation having incorporated a Lagrange parameter, a first long run average function for an objective of maximizing the throughput, and a second long run average function for the inequality constraint, wherein a problem of maximizing the throughput while satisfying the inequality constraint cannot be appropriately represented by an analytical expression in terms of a Parameter of interest, the first long run average function is not represented in terms of the parameter of interest, and the second long run average function is not represented in terms of the Parameter of interest; and
      iteratively estimate averages of the first long run average function and the second long run average function based on collected network traffic, estimate a gradient of the Lagrange equation, and update the Lagrange parameter, so that a parameter value for the parameter of interest that may lead to an extreme value for the Lagrange equation is identified.

20. The network router of claim 19, wherein the processing unit is further configured to estimate a Hessian of the Lagrange equation.

* * * * *